United States Patent
Reddy et al.

(10) Patent No.: US 9,571,390 B2
(45) Date of Patent: Feb. 14, 2017

(54) PATH OPTIMIZATION FOR ADAPTIVE STREAMING

(71) Applicant: Cisco Technology, Inc., San Jose, CA (US)

(72) Inventors: Tirumaleswar Reddy, Bangalore (IN); Prashanth Patil, Banglaore (IN); William Ver Steeg, Buford, GA (US); Daniel Wing, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 210 days.

(21) Appl. No.: 14/089,193

(22) Filed: Nov. 25, 2013

(65) Prior Publication Data

US 2015/0149657 A1    May 28, 2015

(51) Int. Cl.
*H04L 29/06* (2006.01)
*H04L 12/721* (2013.01)

(52) U.S. Cl.
CPC ........... *H04L 45/72* (2013.01); *H04L 63/1408* (2013.01); *H04L 63/0245* (2013.01); *H04L 63/20* (2013.01)

(58) Field of Classification Search
CPC .... H04L 63/14; H04L 63/145; H04L 63/1408; H04L 63/1441; H04L 63/1416; H04L 63/1425; G06F 21/56; G06F 21/564
See application file for complete search history.

(56) References Cited

U.S. PATENT DOCUMENTS

| | | | |
|---|---|---|---|
| 6,088,803 A * | 7/2000 | Tso et al. | 726/22 |
| 7,886,145 B2 | 2/2011 | Smith et al. | |
| 8,607,066 B1 * | 12/2013 | Kailash et al. | 713/188 |
| 8,839,374 B1 * | 9/2014 | Mehta et al. | 726/4 |
| 2004/0181687 A1 * | 9/2004 | Nachenberg et al. | 713/201 |
| 2008/0295176 A1 * | 11/2008 | Holostov et al. | 726/24 |
| 2010/0281539 A1 * | 11/2010 | Burns | H04L 63/1441 726/23 |
| 2011/0126287 A1 * | 5/2011 | Yoo | 726/24 |
| 2013/0097666 A1 * | 4/2013 | Wu et al. | 726/1 |
| 2013/0291082 A1 * | 10/2013 | Giladi et al. | 726/7 |
| 2013/0297769 A1 | 11/2013 | Chang et al. | |
| 2013/0298184 A1 | 11/2013 | Ermagan et al. | |

OTHER PUBLICATIONS

A. Van Brandenburg et al., RFC 6983—Models for HTTP-Adaptive-Streaming-Aware Content Distribution Network Interconnection (CDNI), Jul. 2013, Internet Engineering Task Force.
Unpublished U.S. Appl. No. 13/529,025, filed Jun. 21, 2012.

* cited by examiner

*Primary Examiner* — Chris Parry
*Assistant Examiner* — Daeoo Lee
(74) *Attorney, Agent, or Firm* — Lempia Summerfield Katz LLC

(57) ABSTRACT

In one implementation, downloading of streaming content using a security as a service (SecaaS) system is more efficient because portions of the streaming content may not be inspected by the SecaaS. A first request to download content from a content provider is received, and a connection is initiated with a security provider, which inspects the first chunk of the content and generates a routing instruction based on the inspection of the first chunk of content. Based on the routing instructions and the inspection of the first chunk, a request for a second chunk of the streaming content is addressed to the content provider. The second chunk of the streaming content, circumvents the SecaaS system.

20 Claims, 7 Drawing Sheets

PATH OPTIMIZATION FOR ADAPTIVE STREAMING

TECHNICAL FIELD

This disclosure relates in general to the field of security as a service (SecaaS), and more particularly, to path optimization for adaptive data streaming in security as a service.

BACKGROUND

Any computer connected to the Internet may be susceptible to malicious attacks. Software, such as anti-virus software, anti-malware software, or other security software, is available to protect the computer. However, these types of software become out dated very quickly. Further, the end user, or an administrator, of the computer must be responsible for obtaining, installing, and operating the software.

The security software may be outsourced to another device. For example, a security as a service system provides security services via the Internet on a subscription basis. The security as a service system may use shared resources across many subscribers. Enterprises may outsource security management to the security as a service system. All Internet traffic for the enterprise may be routed through the security as a service system, which identifies potentially malicious data. However, routing all traffic through the security as a service system may be expensive and redundant.

BRIEF DESCRIPTION OF THE DRAWINGS

Exemplary embodiments of the present embodiments are described herein with reference to the following drawings.

DESCRIPTION OF EXAMPLE EMBODIMENTS

Overview

In one embodiment, a first request to download content is received from an endpoint. The request to download content is sent as a request to a security provider for analyzing the request. The security provider also inspects a first chunk of content received in response to the request and originating with a content provider and generates a routing instruction based on the inspection. A request for a second chunk is addressed to the content provider based on the routing instruction.

In another embodiment, a request to download content is received and forwards to a content provider to download content. A chunk of the content from the content provider is received and inspect. A routing instruction is generated based on the inspection according to a security as a service policy.

Example Embodiments

A cloud connector redirects all hypertext transfer protocol (HTTP), file transfer protocol (FTP) traffic, and other traffic to a security server. The cloud connector may be a network device or software on a network device that administers a local network. The cloud connector may be a component of an endpoint such as a mobile phone or personal computer. The security device is configured to analyze the traffic. The security device may perform deep packet inspection, heuristics, and/or application identification on the traffic. For example, the security device may block malicious software from the endpoint. In another example, the security device may enforce policies such as filtering specific websites or content from the endpoint.

In many networks, all traffic from all sources is routed to the security device and inspected by the security device. There are several scenarios in which this is an inefficient use of resources. First, some traffic may be trusted because the content provider is reputable. Second, some traffic may be made of smaller chunks divided from a large data file. When one or a subset of the data chunks of the data file have been inspected, an assumption may be made that subsequent chunks may forego inspection. Third, no inspection may be performed on some specific types of files. For example, some files may include an indication of earlier inspection. The following embodiments analyze one portion of streaming content to determine whether subsequent portions of the stream content should be subjected to inspection by the security device.

Figure 3:
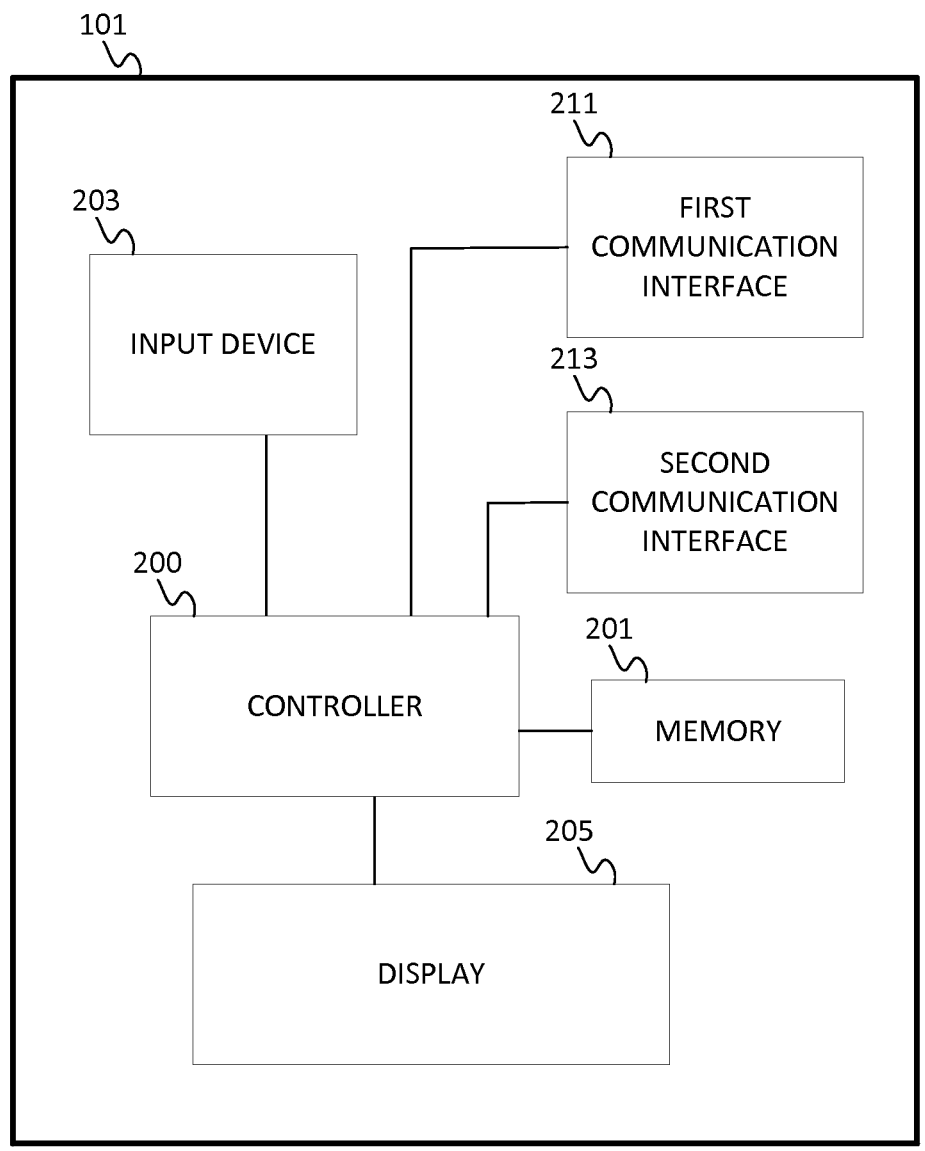
FIG. 3 illustrates an example endpoint for the system of FIG. 1.

FIG. 3. illustrates an example system of path optimization for adaptive streaming. The system includes a node device 101, a cloud connector 103, a cloud service server 105 connected to the network 107 (e.g., the Internet). Additional, different, or fewer devices may be included in the system. Each of the node device 101, the cloud connector 103, and the cloud service server 105 may include a memory and a processor for adaptive streaming.

The node device 101 may be any type of computing device. Examples include laptop computers, desktop computers, mobile phones, personal digital assistants, tablet computers, video game consoles, servers, or other devices. The cloud connector 103 may establish and maintain a connection between the node device 101 and the cloud service server 105.

The node device 101 forwards all outgoing traffic or all traffic addressed to outside a trusted network to the cloud connector 103. The node device 101 generates a request for data content. The request may specify a domain name, an address, or a uniform resource locater of a content provider. The requested data may be websites, file downloads, or any type of traffic. The cloud connector 103 routes the request to network 107 or directly to the content provider.

The content may be streaming multimedia such as audio, video, or a combination of audio and video. The content may be organized in chunks in an adaptive bitrate streaming technique. An encoder at the content provider may be configured to encode the content into streams of different bit rates. The bitrate received by the node device 101 may change according to the resources available to the node device 101. The resources may include one or more of bandwidth, latency, and processing availability.

In one example, the node device 101 analyzes the available resources and requests a specific stream. In another example, the node device 101 detects packet loss and adjusts the request stream accordingly. The node device 101 may receive a manifest file from the content provider that lists available streams. The node device 101 may default to the lowest bitrate stream and increase to higher bitrate streams when possible. For example, the node device 101 may monitor the download rate. If the download rate exceeds the bitrate of the current stream, the node device 101 may request a higher bitrate stream. In another example, feedback data indicative of the available resources at the node device 101 is sent to the content providers, which selects the appropriate, or best, stream for the node device 101.

The chunks of the content may be defined according to an HTTP adaptive streaming (HAS) protocol. Examples include HTTP Live Streaming (HLS), HTTP Smooth Streaming (HSS), HTTP Dynamic Streaming (HDS), 3GPP Adaptive HTTP Streaming (AHS) and MPEG Dynamic Adaptive Streaming over HTTP (DASH). The content provider may divide content into chunks that are of a predetermined duration or a predetermined size. In one example, each chunk includes 2 minutes of video.

The chunks are independently encodable and decodable. Therefore, the node device 101 can receive one chunk encoded with one encoding and the next chunk encoded with another encoding. The node device 101 is configured to seamlessly switch between different encodings at the chunk boundary. Before requesting the next chunk, the node device 101 may choose between multiple alternative encodings independent of previously received or requested chunks.

The chunks may be segmented or fragmented. Segmented chunks are stored in standalone files. Segmented chunks may have different file locations or URLs for retrieving the separate chunks. Fragmented chunks are stored together as a single file. Fragmented may be specified using an identifier in addition to the URL. The identifier may be a timestamp, byte range, sequence number, or another factor.

The content provider may generate a manifest file including a media presentation description that describes how the content has been chunked. For example, for segmented chunks, which may be in different addressable location, the manifest file includes an address for each chunk. For fragmented chunks, which may be combined in a single file, the manifest file may include the identifier for locating chunks within the single file. The manifest file associated with the content stream may define chunks as relative URLs, absolute URLs with redirection, or absolute URLs without redirection.

The content provider provides a first chunk of the content in response to the request. The first chunk is sent to the cloud service server 105. The cloud service server 105 applies one or more security inspections on the first chunk. The cloud service server 105 may perform deep packet inspection, behavioral analysis inspection, and/or application identification on the traffic. Deep packet inspection may examine data from the header and/or the payload of packets. The deep packet inspection may identify non-compliance with protocols, viruses, malware, spam, or other unwanted types of data. The deep packet inspection may be configurable. Behavior analysis inspection may generate usage statistics for the node device 101. For example, a chunk may fail the behavior analysis inspection if data quotas have already been met. The cloud service server 105 may monitor the types of data sent to the node device 101 for the purpose of limiting adult content or illegal content. For example, a chunk may fail the application identification inspection if the chunk is identified as part of a black listed content.

The cloud service server 105 may generate a routing instruction based on the inspection of the first chunk of content. The routing instruction may indicate whether the first chunk of content passed inspection. The cloud connector 103 may receive the routing instruction and change the routing of subsequent traffic based on the routing instruction. Subsequent chunks for the same stream of data may be sent straight from the content provider to the cloud connector 103 or the node device 101. In one example, all future traffic, even from different streams of data, from the same content provider may be sent straight from the content provider to the cloud connector 103 or the node device 101.

In one example, the cloud connector 103 modifies requests for content based on the routing instruction. When a subsequent request addressed to the content provider is received from the node device 101, the cloud connector 103 forwards the request directly to the content provider. The cloud connector 103 may insert the address of the content provider in the header of the packet. In one example, the default operation of the cloud connector 103 may be to remove the address of the content provider and insert the address of the cloud connector. Therefore, in response to the routing instruction, the cloud connector 103 may omit removing the address of the content provider so that the request is sent directly to the content provider instead of the cloud service server 105.

Figure 2:
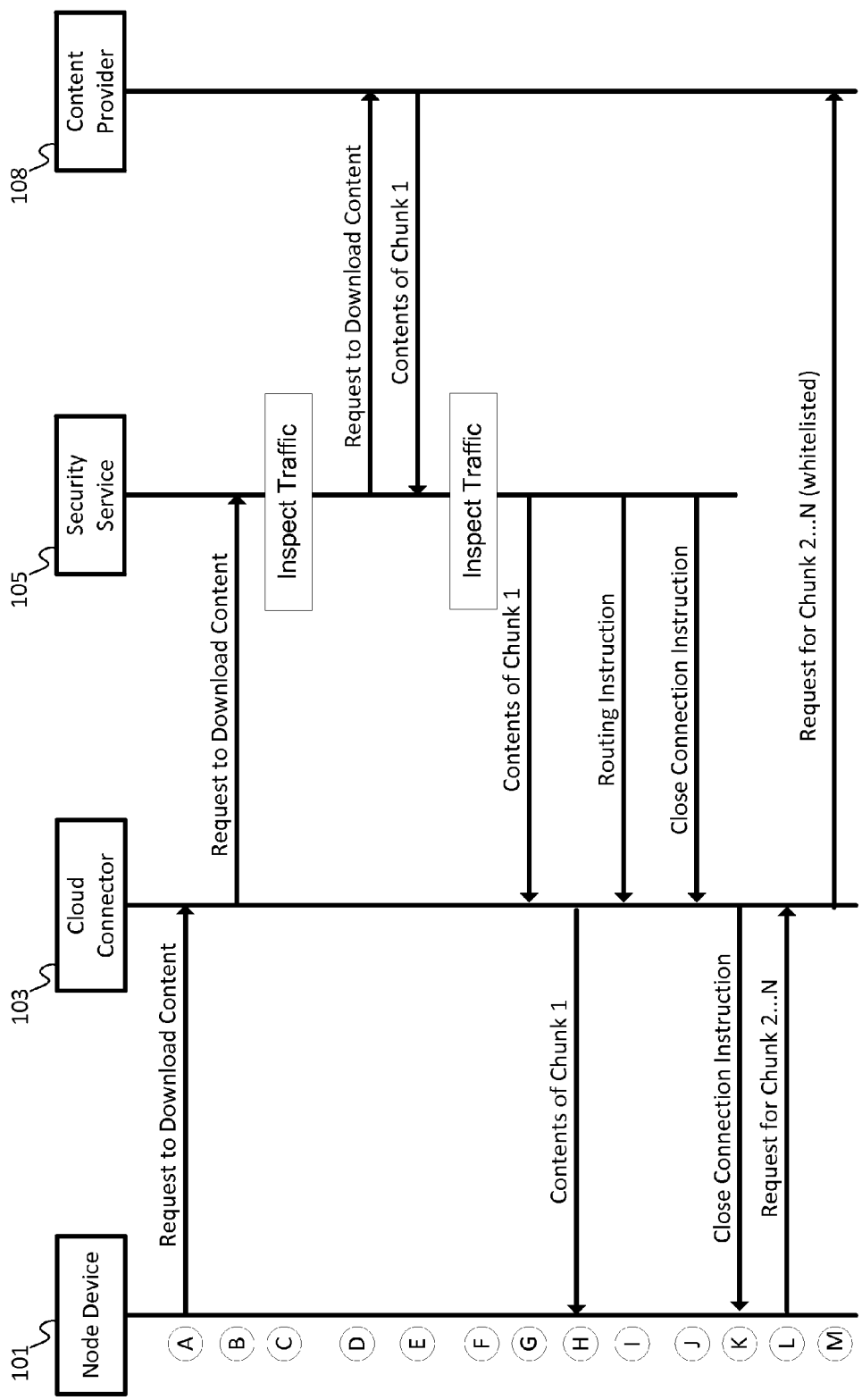
FIG. 2 illustrates an example timing diagram for path optimization for adaptive streaming.

FIG. 2 illustrates an example timing diagram for path optimization for adaptive streaming. The timing diagram illustrates communications for the node device 101, the cloud connector 103, a security service or cloud service server 105, and the content provider 108. Additional, different, or fewer components may be included. Time is measured on the vertical axis, which may or may not be to scale.

As shown at stage A, a request for content originates at the node device 101. The request may be an HTTP command (e.g., get, post, head, options, trace, or connect). As an example, the HTTP get command may specify a resource to retrieve. The request may include the address of an adaptive streaming resource. As shown at stage B, the request is forwarded from the cloud connector 103 to the cloud service server 105.

As shown at stage C, the cloud service server 105 may inspect the request. The cloud service server 105 may analyze the request for the address of the content provider, the type of content, or another identifier. The cloud service server 105 may store an approved list of authenticated content providers by IP address or domain name. The cloud service server 105 may store a lookup table that associates type of data with inspection techniques. In alternative embodiments, the inspection of the request may be omitted, such as routing the request from the cloud connector 103 or the endpoint 101 to the content provider without routing to the cloud service server 105 or the cloud service server 105 receiving but not inspecting the request.

As shown at stage D, the request is forwarded from the cloud service server 105 to the content provider 108. As shown at stage E, the content provider 108 returns a first chunk of the streaming content in response to the request. The first chunk is returned to the cloud service server 105. The request may specify a sequence number of the chunk or the identity of the streaming content. The chunk may be a predetermined size or the size of the chunk may be specified in the request. Example sizes include 10 megabytes, 100 megabytes, 1 minute, or 2 minutes.

As shown at stage F, the cloud service server 105 inspects the first chunk of the content. The inspection may include one or more of a content provider test, a data type test, or a malicious software test.

The content provider test may compare a source address in the first chunk to an approved list, or whitelist, for the content provider 108. The approved list may be a list of addresses or domain names that are always trusted as content providers.

A data type test may compare a type of the content to an approved list of data types that are always trusted. For example, the type of the content may include data that indicates the first chunk has already been inspected. For example, the content provider 108 may guarantee that the content does not need inspection. The guarantee from the content provider 108 may be verified using a public and private key. The data type test may identify types of data that are always blocked such as adult content, games, gambling, or any data include credit card numbers or social security numbers.

The malicious software test may include a malware scanner that detects malicious code. The malware scanner may be configured to detect any combination of viruses, Trojan horses, worms, ransomeware, rootkits, keyloggers, dialers, spyware, rogue security software or other malicious programs.

The cloud service server 105 may perform any combination of the content provider test, the data type test or the malicious software test in order to determine that the first chunk, or the entire stream including the first chunk, is of no interest or secure according to the cloud service server 105. In one example, the cloud service server 105 may determine whether the first chunk includes a high, medium, or low level of risk. The level of risk may be calculated according to a predetermined number of results from the available tests.

The cloud service server 105 may calculate a risk score and compare the risk score to a low threshold, a medium threshold, and a high threshold. When there is a high level of risk, the cloud service server 105 may block the first chunk. When there is a low level of risk, the cloud service server 105 may determine that no further inspection of this content stream is needed. When there is a medium level of risk, the cloud service server 105 may forward the first chunk but determine that further inspection of subsequent chunks of the content should continue.

As shown at stage G, at least when a low level of risk or a medium level of risk is determined, the cloud service server 105 forwards the first chunk of the content to the cloud connector 103. As shown at stage H, the cloud connector 103 sends the first chunk of content to the node device 101. The node device 101 presents the audio and/or video to the user using speakers and/or a display.

As shown at stage I, the cloud service server 105 also sends a routing instruction to the cloud connector 103. The routing instruction may be based on the risk score. That is, when the cloud service server 105 determines a high level of risk, the routing instruction may instruct the cloud connector 103 to stop requesting chunks of the content. When the cloud service server 105 determines a medium level of risk, the routing instruction may be blank, or not sent, because the cloud connector 103 should continue to request chunks of the content through the cloud service server 105. Alternatively, an affirmative indication of continued operation through the cloud service server 105 is included in the routing instruction. When the cloud service server 105 determines a low level of risk, the routing instruction may command the cloud connector 103 to forward subsequent requests for the content to the content provider 108, circumventing the cloud service server 105.

Stages G and I may be performed simultaneously or at substantially the same time. The routing instruction may be combined with one or more packets of the first chunk of content. The routing instruction may be transmitted in an independent control channel. The control channel, in addition to the routing instruction, may support communications between the cloud connector 103 and the cloud service server 105 that include one or more of transport telemetry, configuration, and provisioning information. The routing instruction may list the address, domain, or other identifier for the content provider 108.

As shown at stage J, the cloud service server 105 may generate an instruction to close the connection between the cloud connector 103 and the cloud service server 105. The close connection instruction may be generated in response to the routing instruction or in response to the inspection of the first chunk of the content. The close connection instruction may be forwarded from the cloud connector 103 to the node device 101 at stage Alternatively, in response to the routing instruction, the cloud connector 103 or the node device 101 may generate the close connection instruction. Because the connection is closed, the node device 101 creates a new TCP session to download subsequent chunks.

As shown at stage L, the node device 101 may request a second chunk or subsequent chunks of the content. As shown at state M, the cloud connector 103 forwards the request for the second or subsequent chunk of content to the cloud service server 105 (e.g., where the first chunk was medium risk). The cloud connector 103 may identify the address or other identifier of the content provider 108 from the header of the second or subsequent request. The cloud connector 103 may use a pattern matching algorithm to parse the headers. One example pattern matching algorithm is regex. Regex, or regular expression utility, may be configured to identify a sequence of characters such as the address or identifier of the content provider 108.

When the routing instruction instructs the cloud connector 103 to request the second or subsequent chunks directly from the content provider 108 (e.g., first chunk was low risk), the cloud connector 103 modifies the header of the request, if necessary, and forwards the request to the content provider 108. Likewise, the cloud connector 103 may receive the second or subsequent chunks directly from the content provider 108.

Upon receipt of the routing instruction from the cloud service server 105, the cloud connector 103 may start a timeout clock. The routing instruction may expire when the time clock reaches a predetermined amount of time (e.g., 10 minutes, 1 day, or another value). Alternatively, the routing instruction may expire after a predetermined number of content requests are forwarded directly to the content provider 108 based on the routing instruction. Alternatively, the routing instruction may expire after a predetermined amount of data is received from the content provider 108 based on the routing instruction. Upon expiration, the cloud connector 103 forwards content requests through the cloud service server 105.

Figure 1:
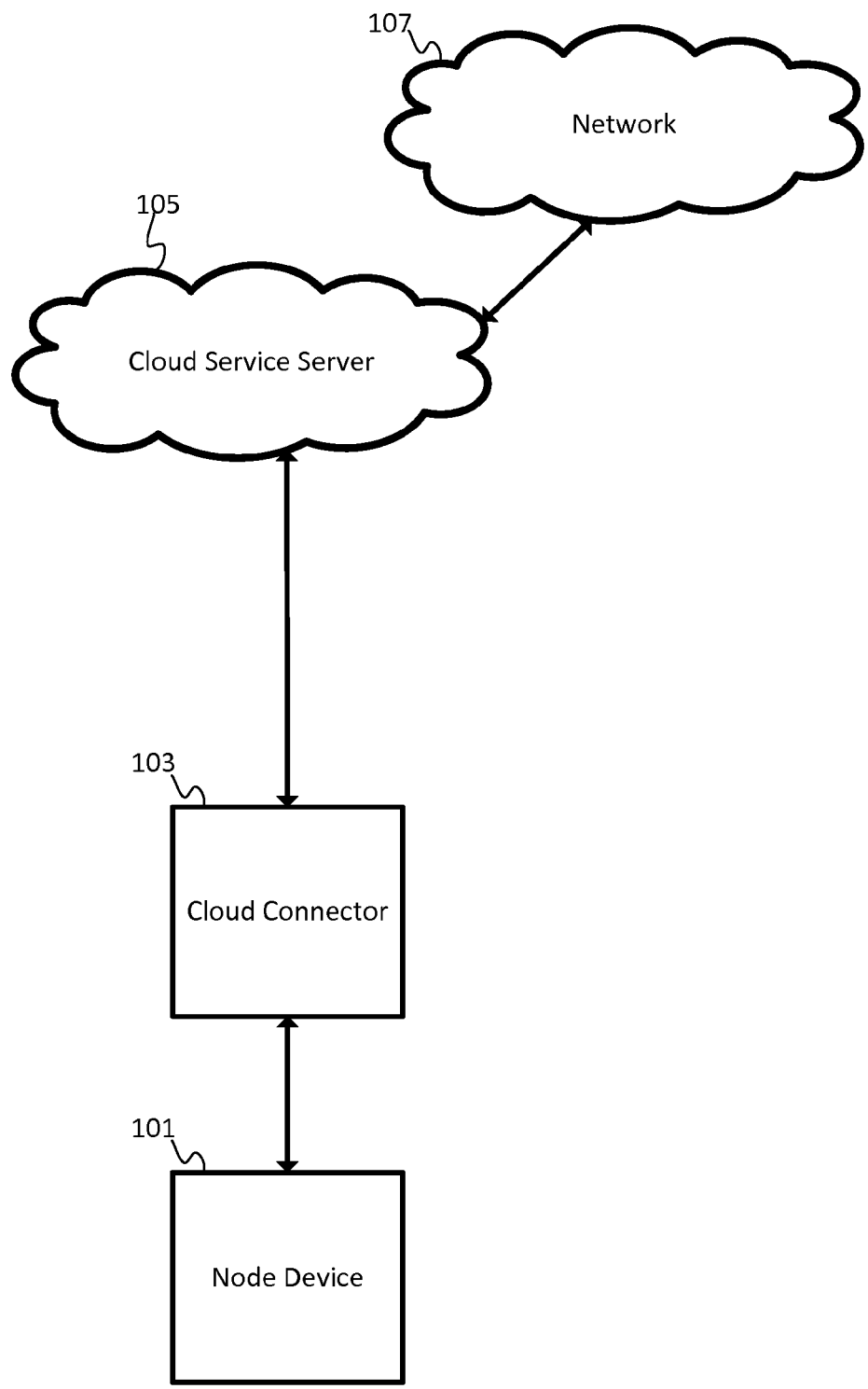
FIG. 1 illustrates an example system of path optimization for adaptive streaming.

FIG. 3 illustrates an example node device 101 for the systems of FIG. 1 and FIG. 2. The node device 101 includes a controller 200, a memory 201, an input device 203, a first communication interface 211, a second communication interface 213, and a display 205. Additional, different, or fewer components may be provided. Different network devices may have the same or different arrangement of components.

Figure 4:
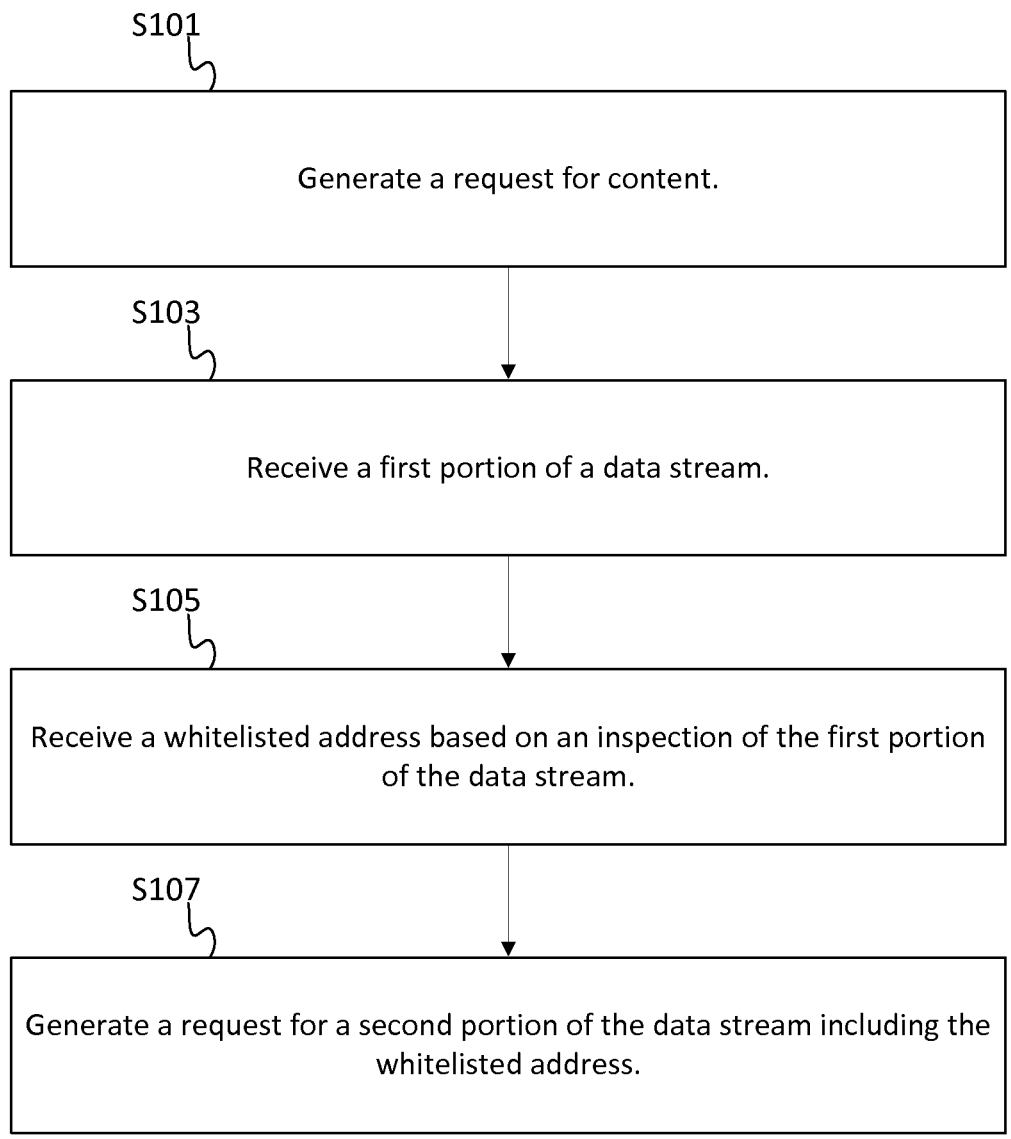
FIG. 4 illustrates an example flowchart of operation for the example endpoint of FIG. 3.

FIG. 4 illustrates an example flowchart of operation for the example endpoint of FIG. 3. Additional, different, or fewer acts may be provided. The acts are performed in the order shown or other orders. The acts may also be repeated.

At act S101, the input device 203 receives a user input as a request for content. The user input may be a command to access a website or a file from the Internet. Alternatively, the request for content may be the HTTP command generated by the controller 200 in response to the user input and sent via the communication interface 211.

At act S103, the communication interface 213 receives a response from the Internet for the request for content. The response may include a first portion of a data stream representative of the content. The first portion may be organized as a chunk of data having an encoding specified by the request. The encoding may include an audio codec and a video codec. Example audio codecs may include MP3 or windows media audio. Example video codecs include H.264/MPEG-4 AVC. H.264/MPEG-4 AVC, which may be defined according to the joint standard published in May 2003 jointly by the ITU-T Video Experts Coding Group and the Moving Picture Experts Group.

At act S105, the communication interface 213 receives a whitelisted address to be applied to requests for subsequent portions of the data streams. The whitelisted address may be an address for a provider for the content that has been verified as reputable by a security server. The whitelisted address may be added to a list of previously verified content providers stored in memory 201. In one example, the whitelisted address is verified using a list of known trusted sources of streaming content. In one example, the first portion of the data stream is inspected by the security server in order to add the source of the first portion of the data stream to the list of trusted sources of streaming content.

At act S107, the controller 200 generates a request for content that specifies another portion of the content. The second or subsequent request for content is addressed to the whitelisted address. In one alternative, the request may be addressed to a cloud connector device that inserts the whitelisted address into the request. Accordingly, the second or subsequent portions of content received from the Internet are not routed through the security service or subjected to further inspection.

The input device 203 may be one or more buttons, keypad, keyboard, mouse, stylist pen, trackball, rocker switch, touch pad, voice recognition circuit, or other device or component for inputting data to the mobile device 101. The input device 203 and the display 205 may be combined as a touch screen, which may be capacitive or resistive. The display 205 may be a liquid crystal display (LCD) panel, light emitting diode (LED) screen, thin film transistor screen, or another type of display. The display 205 is configured to display the first and second portions of the content.

Multiple SecaaS servers may be located around the world and may be provided based on geographic location or as specified in a license. A router of the network may be configured to direct traffic to a specific SecaaS server as a primary server. In addition, if connectivity fails, the router may be configured to direct traffic to another SecaaS server as a secondary server. However, if part of the communication session is transmitted outside of the local network and not subjected to the security service, that portion of the communication session may not be regulated.

The node device 101 may also include a positioning device that employs a Global Positioning System (GPS), Global Navigation Satellite System (GLONASS), or a cellular or similar position sensor for providing location data. The cloud service server 105 may be selected based on a geographic position of the mobile device 101 or the cloud connector 103. The cloud service servers may also be selected based on the administration of the respective networks. Some networks may automatically connect to a specific cloud service server based on a subscription, agreement, or license.

Figure 5:
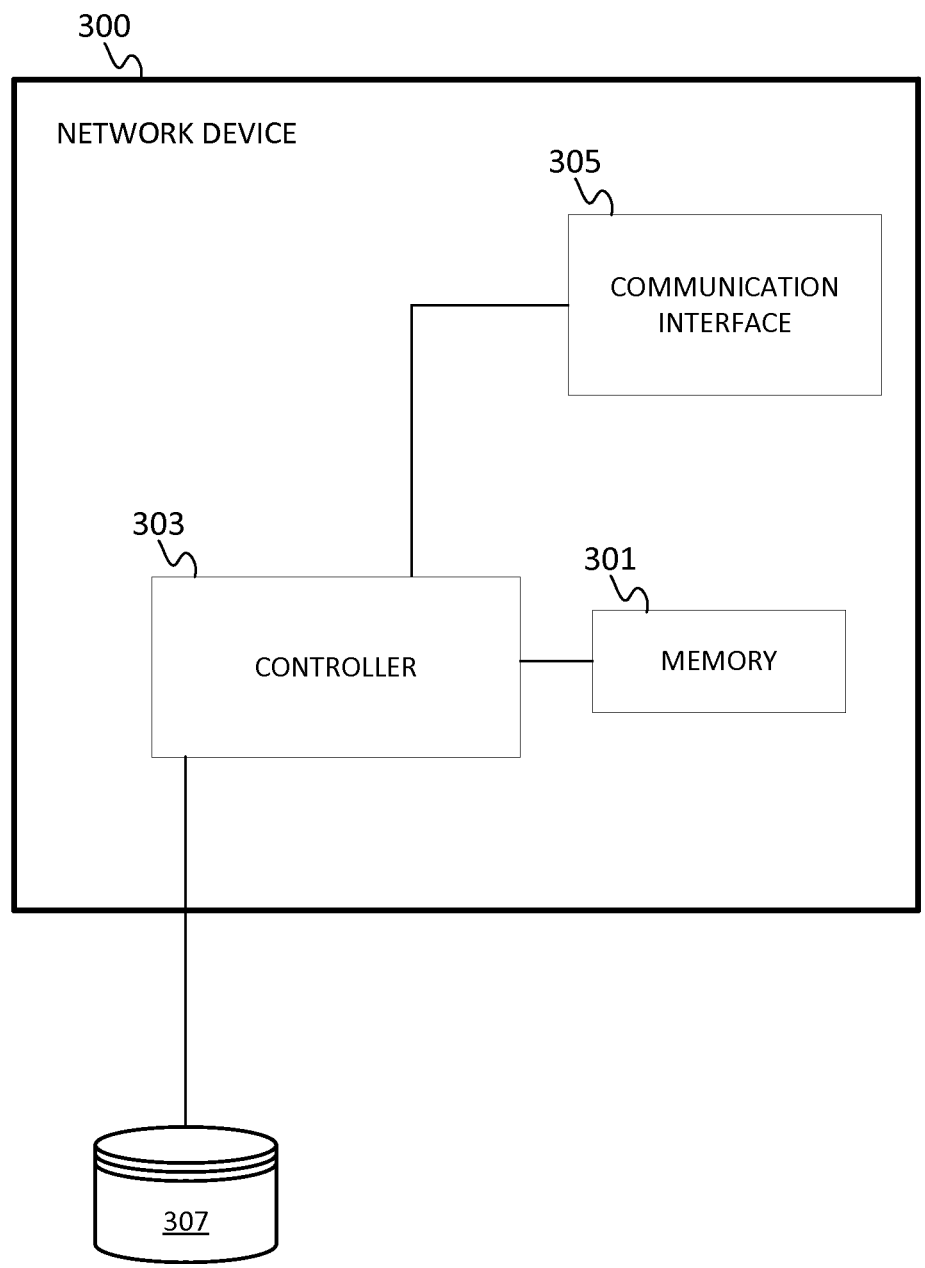
FIG. 5 illustrates an example network device for the system of FIG. 1.

FIG. 5 illustrates an example network device 300 for the system of FIG. 1. The network device 300 may correspond to the cloud service server 105 or the cloud connector 103. The network device 300 includes at least a memory 301, a controller 303, and a communication interface 305. In one example, a database 307 stores the policy profiles for security as a service. Additional, different, or fewer components may be provided. Different network devices may have the same or different arrangement of components.

Figure 6:
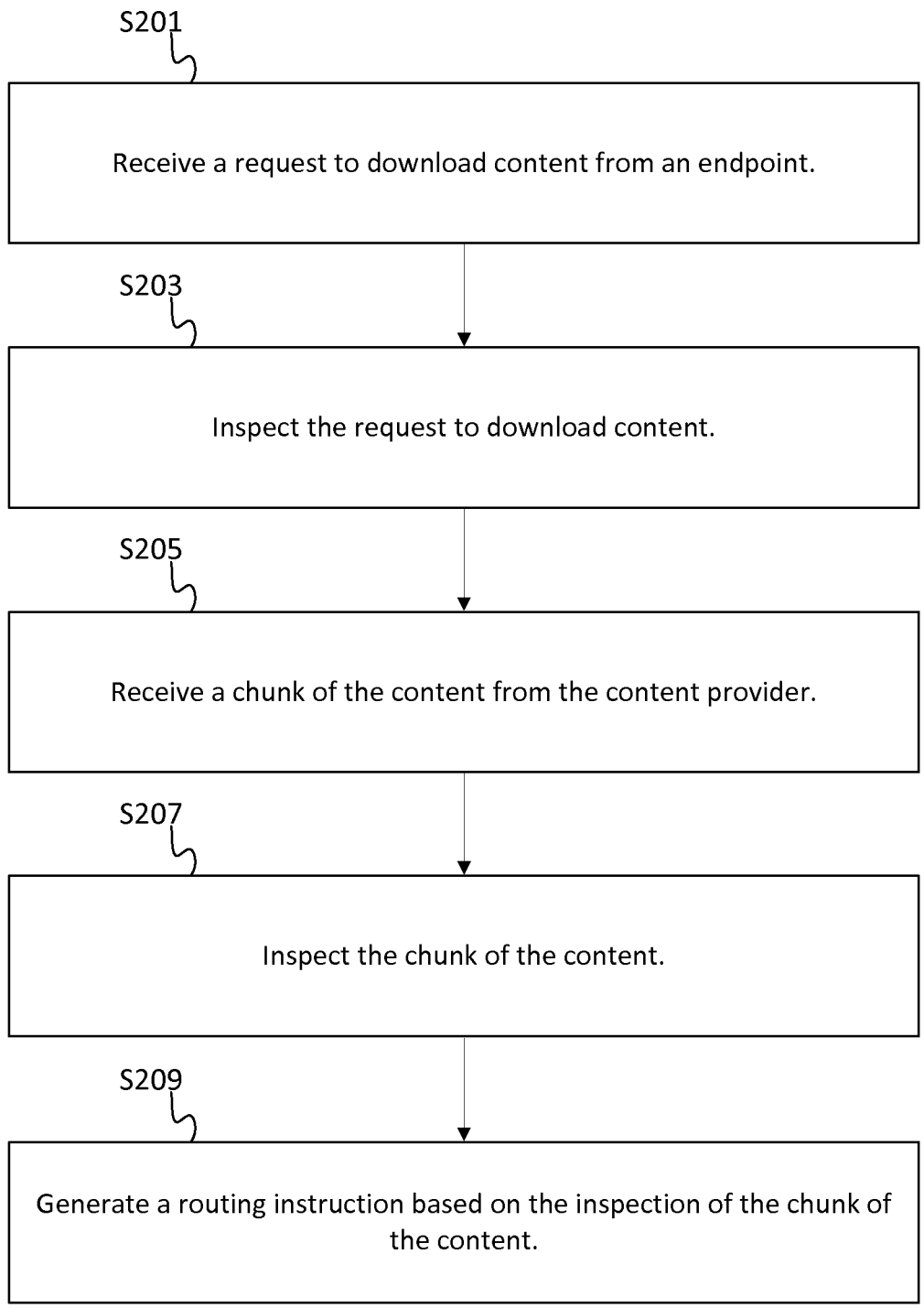
FIG. 6 illustrates an example flowchart of operation for the network device of FIG. 5.
Figure 7:
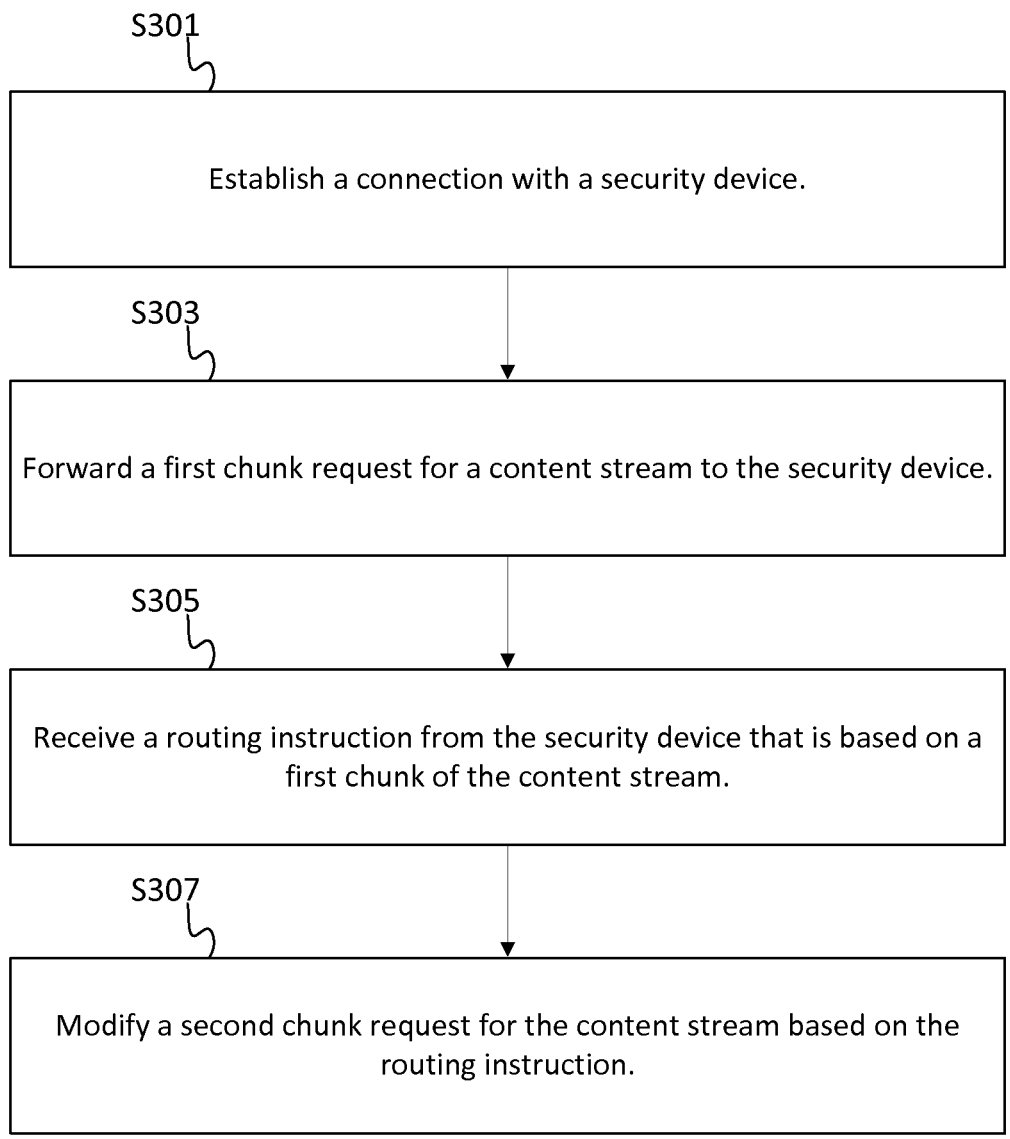
FIG. 7 illustrates an example flowchart of operation for the network device of FIG. 5.

FIG. 6 illustrates an example flowchart of operation for the network device 300 of FIG. 5 as the cloud service server 105. Additional, different, or fewer acts may be provided. The acts are performed in the order shown or other orders. The acts may also be repeated.

At act S201, the controller 303 or communication interface 305 of the cloud service server 105 receives a request to download content for an endpoint. The request to download content may be received from a cloud connector at or associated with a mobile device or personal computer.

At act S203, the controller 303 inspects the request to download content. The inspection of the request may check the destination address against prohibited addresses or types of addresses. The request may also be inspect to determine whether the request was generated by malicious software. Act S203 may be omitted and all requests for content may be forwarded to their destination addresses.

At act S205, the communication interface 305 or controller 303 receives a chunk of the content from the content provider 108. At act S207, the controller 303 inspects the chunk of content by applying a security service to the chunk of content. The security service may include malicious software blocking, content filtering, and statistics gathering. Security services provide malicious software blocking as protection against viruses, spyware, and other malware that targets the endpoint devices. Security services provide content filtering to limit the types of content received at the endpoint device.

The content filtering may be based on parental controls, or specifically tailored filtering for mobile hotspots or public networks. The content filtering may be based on a user profile. A security service may be configured to identify impermissible content from a data file formed from data packets from multiple subflows in multipath communication. Security services provide statistics gathering by counting data flows. For example, a number of packets or a quantity of data in a flow may be counted and reported for network analytics. A security service may be configured to gather statistics from the stream for regulating data limits. Alternatively or in addition, the security service may provide spam filtering. The security service may include an email filter. The email filter may include criteria such as keywords, address munging information, and/or a list of known spammers.

At act S209, the controller 303 generates a routing instruction based the chunk of content. The controller 303 may calculate a risk score for the chunk of content based on one or any combination of the security services. The controller 303 compares the risk score to a threshold. If the risk score is less than the threshold, the controller 303 determines that the stream of content is safe. When the stream is safe, the routing instruction includes a command for the cloud connector or endpoint to circumvent the cloud service server 105 and send subsequent requests for chunks of the stream directly to the content provider 108. The routing instruction may be inserting in a forwarding database or table.

FIG. 6 illustrates an example flowchart for operation the network device 300 of FIG. 5 as the cloud connector 103. Additional, different, or fewer acts may be provided. The acts are performed in the order shown or other orders. The acts may also be repeated.

At act S301, the communication interface 305 of the cloud connector 103 establishes a connection with the security device. The security device may be a security as a service (SecaaS). In one example, all traffic is routed by default through the connection with the security device. In another example, specific types of traffic (e.g., HTTP) are routed through the connection with the security device.

At act S303, the communication interface 305 or controller 303 forwards a first chunk request for a content stream to the security device. The content stream may be identified in the request by URL.

At act S305, the communication interface 305 or controller 303 receives a routing instruction from the security device that is based on an inspection performed by the security device on the first chunk of the content stream. The inspection may scan the first content for malicious code. The routing instruction may include an authorization code. The communication interface 305 may also receive the streaming content for the first chunk of the content stream.

At act S307, the controller 303 may generate or modify a second chunk request for the same content stream according to the routing instruction. In one example, the controller 303 may insert the address of the content provider 108 in the second chunk request. Alternatively, the controller 303 may refrain from removing the address of the content provider 108 and refrain from inserting the address of the security device into the second chunk request. The controller 303 may insert the authorization code into the second chunk request. The content provider 108 may be configured to return content directly to the mobile node or the cloud connector 103 in response to the authorization code.

The controllers 200 and 303 may include a general processor, digital signal processor, an application specific integrated circuit (ASIC), field programmable gate array (FPGA), analog circuit, digital circuit, combinations thereof, or other now known or later developed processor. The controllers 200 and 303 may be a single device or combinations of devices, such as associated with a network, distributed processing, or cloud computing.

The memories 201 and 301 may be a volatile memory or a non-volatile memory. The memories 201 and 301 may include one or more of a read only memory (ROM), random access memory (RAM), a flash memory, an electronic erasable program read only memory (EEPROM), or other type of memory. The memories 201 and 301 may be removable from the network device 300, such as a secure digital (SD) memory card.

In addition to ingress ports and egress ports, the communication interface may include any operable connection. An operable connection may be one in which signals, physical communications, and/or logical communications may be sent and/or received. An operable connection may include a physical interface, an electrical interface, and/or a data interface.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method for providing network security at a network device, the method comprising:
   receiving, by the network device, a first endpoint request to download content;
   sending, by the network device, the first request to a security provider for network security inspection, wherein the security provider forwards the first request to a content provider;
   wherein an inspection is performed at the security provider on a first chunk of the content in response to the first request and a routing instruction is generated in response to the inspection, wherein the routing instruction requests that subsequent requests for the content are blocked when a risk score for the first chunk is more than a threshold level and the inspection is not passed, and the routing instruction indicates that further inspection on subsequent chunks is omitted when the risk score for the first chunk is less than the threshold level and the inspection is passed;
   receiving, by the network device, the first chunk of the content from the security provider, wherein the first chunk of content includes a header and a payload;
   receiving, by the network device, the routing instruction based on the inspection of the payload of the first chunk of content that originated with the content provider; and
   modifying, using a processor of the network device, a second request or a subsequent request addressed to the content provider to circumvent the security provider, wherein the second request is for a second chunk of the content based on the routing instruction.

2. The method of claim 1, further comprising:
   initiating a connection with the security provider before sending the first request; and
   closing the connection with the security provider in response to the routing instruction.

3. The method of claim 1, wherein the routing instruction includes a whitelist entry for the content provider.

4. The method of claim 1, further comprising:
   receiving the second chunk of the content, wherein the first chunk and the second chunk are consecutive segments of a media stream.

5. The method of claim 1, wherein the first chunk is encoded at a first bitrate and the second chunk is encoded at a second bitrate.

6. The method of claim 1, wherein the routing instruction includes a security level based on the inspection of the first chunk of content.

7. The method of claim 1, further comprising:
receiving an instruction to close a connection used to transmit the first chunk after the first chunk is sent to an endpoint.

8. The method of claim 1, further comprising:
starting a timer based on receipt of the routing instruction; and
removing the routing instruction when the timer reaches a predetermined timeout period.

9. The method of claim 1, wherein the second request addressed to the content provider indicates whether the first chunk passed the inspection.

10. A non-transitory computer readable medium including instructions that when executed are configured to perform a method comprising:
receiving, by a network device, a first endpoint request to download content;
sending, by the network device, the first request to a security provider for network security inspection, wherein the security provider forwards the first request to a content provider;
wherein an inspection is performed at the security provider on a first chunk of the content in response to the first request and a routing instruction is generated in response to the inspection, wherein the routing instruction requests that subsequent requests for the content are blocked when a risk score for the first chunk is more than a threshold level and the inspection is not passed, and the routing instruction indicates that further inspection on subsequent chunks is omitted when the risk score for the first chunk is less than the threshold level and the inspection is passed;
receiving, by the network device, the first chunk of the content from the security provider, wherein the first chunk of content includes a header and a payload;
receiving, by the network device, the routing instruction based on the inspection of the payload of the first chunk of content that originated with the content provider; and
modifying, using a processor of the network device, a second request or a subsequent request addressed to the content provider to circumvent the security provider, wherein the second request is for a second chunk of the content based on the routing instruction.

11. The non-transitory computer readable medium of claim 10, the instructions further configured to perform:
initiating a connection with the security provider before sending the first request; and
closing the connection with the security provider in response to the routing instruction.

12. The non-transitory computer readable medium of claim 10, wherein the routing instruction includes a whitelist entry for the content provider.

13. The non-transitory computer readable medium of claim 10, the instructions further configured to perform:
receiving the second chunk of the content, wherein the first chunk and the second chunk are consecutive segments of a media stream.

14. The non-transitory computer readable medium of claim 10, wherein the first chunk is encoded at a first bitrate and the second chunk is encoded at a second bitrate.

15. The non-transitory computer readable medium of claim 10, wherein the routing instruction includes a security level based on the inspection of the first chunk of content.

16. The non-transitory computer readable medium of claim 10, the instructions further configured to perform:
receiving an instruction to close a connection used to transmit the first chunk after the first chunk is sent to an endpoint.

17. An apparatus comprising:
a processor; and
a memory including computer program code for one or more programs;
the at least one memory and the computer program code configured to, with the at least one processor, cause the apparatus to at least perform:
receiving, by a network device, a first endpoint request to download content;
sending, by the network device, the first request to a security provider for network security inspection, wherein the security provider forwards the first request to a content provider;
wherein an inspection is performed at the security provider on a first chunk of the content in response to the first request and a routing instruction is generated in response to the inspection, wherein the routing instruction requests that subsequent requests for the content are blocked when a risk score for the first chunk is more than a threshold level and the inspection is not passed, and the routing instruction indicates that further inspection on subsequent chunks is omitted when the risk score for the first chunk is less than the threshold level and the inspection is passed;
receiving, by the network device, the first chunk of the content from the security provider, wherein the first chunk of content includes a header and a payload;
receiving, by the network device, the routing instruction based on the inspection of the payload of the first chunk of content that originated with the content provider; and
modifying, using a processor of the network device, a second request or a subsequent request addressed to the content provider to circumvent the security provider, wherein the second request is for a second chunk of the content based on the routing instruction.

18. The apparatus of claim 17, wherein the first chunk is encoded at a first bitrate and the second chunk is encoded at a second bitrate.

19. The apparatus of claim 17, wherein the routing instruction includes a security level based on the inspection of the first chunk of content.

20. The apparatus of claim 17, the at least one memory and the computer program code configured to, with the at least one processor, cause the apparatus to at least perform:
starting a timer based on receipt of the routing instruction; and
removing the routing instruction when the timer reaches a predetermined timeout period.

* * * * *